Figure 1:
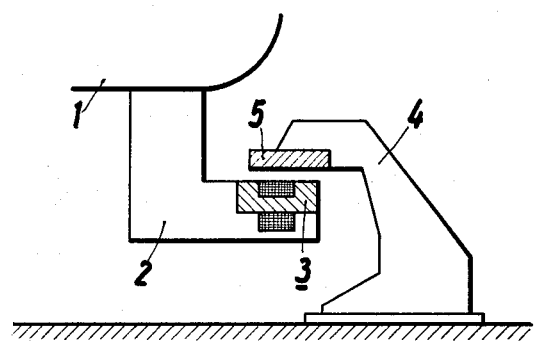

United States Patent [19]
Woitsch

[11] 3,855,939
[45] Dec. 24, 1974

[54] MAGNETICALLY SUPPORTED SUSPENDED RAILWAY
[75] Inventor: Werner Woitsch, Ottobrunn, Germany
[73] Assignee: Messerschmitt-Bolkow-Blohm GmbH, Munich, Germany
[22] Filed: Aug. 10, 1972
[21] Appl. No.: 279,733

[30] Foreign Application Priority Data
Aug. 14, 1971 Germany............................ 2140874

[52] U.S. Cl......................................... 104/148 MS
[51] Int. Cl............................................. B61b 13/08
[58] Field of Search............... 104/148 MS, 148 SS; 308/10; 335/219

[56] References Cited
UNITED STATES PATENTS
3,724,388  4/1973  Karch........................... 104/148 MS
FOREIGN PATENTS OR APPLICATIONS
707,032   6/1941  Germany...................... 104/148 MS
1,035,764 7/1966  Great Britain............... 104/148 MS Primary Examiner—M. Henson Wood, Jr.
Assistant Examiner—George H. Libman
Attorney, Agent, or Firm—Woodhams, Blanchard and Flynn

[57] ABSTRACT

Magnetic suspended and guided railway. In a magnetically suspended railway, the suspending magnets can also be used for lateral guiding where said magnets are located along opposite sides of a given vehicle and cause to cooperate for the purposes of the desired suspension with magnets or magnetic rails arranged along the sides of the desired path of travel. Lateral guiding thereof is accomplished in one embodiment by offsetting the magnets somewhat from the center of the magnetically conductive rail which causes said magnets to generate a laterally directed force as a result of their tendency to center themselves with respect to said rail. By placing similar magnet and rail relationship on both sides of a vehicle, and by appropriately adjusting the degree of energization of said respective magnets, the laterally directed forces may be balanced as needed for straight-away travel or unbalanced as needed for travel around curves. Alternatively, pairs of laterally arranged magnets may be centered with respect to the magnetically conductive rail and one thereof energized more than the other by which similar laterally directed forces will be generated as a result of the tendency of the entire magnetic unit to center itself with respect to the rail. This structure may likewise be repeated on the opposite side of the vehicle and the forces balanced or unbalanced as required.

4 Claims, 3 Drawing Figures

MAGNETICALLY SUPPORTED SUSPENDED RAILWAY

Vehicles which are held freely suspended with respect to a rail arrangement by electromagnets (support magnets) require as a rule additional lateral guides in order to secure sufficient safety against exceeding a stable equilibrium position and allowable vehicle movements, for example under the effect of aerodynamic forces, centrifugal forces or the like. This is particularly true for track vehicles which are held in a suspended position by magnetic attractive forces. Advantageously the guiding of these vehicles is accomplished in a contact-free manner by using magnetic forces.

In the case of one previously known track of this type (German Patent No. 707 032 for example) vehicles are held in a suspended position by electromagnets (support magnets) which attract support rails extending above or below said vehicles and are guided by further electromagnets (guide magnets) arranged on both sides and cooperating with laterally positioned side rails. This lateral guide has the advantage that the vehicles can be maintained at all times in a central position between the side rails by suitable regulation of the energization of the guide magnets. Further, no movable switch parts at all are needed in the zone of the switches. To head in a desired direction of travel it is only necessary to de-energize all guide magnets on one side of the vehicle and if in the switch no change of the direction of travel occurs, it is necessary only to provide a force which acts against the attractive force of the energized guide magnets on the other side of the vehicle. The latter is carried out in the guide means described above by means of a support rail adapted for straight-ahead guiding and associated support magnets which only in the switch zone are located in a magnetically asymmetric position with respect to said support rail due to narrowing of the latter along one side thereof. This results in a so-called return or directing force (lateral force) which tends to place the corresponding edges of the pole surfaces of the support rail and support magnets exactly opposite one another. By narrowing the support rail as above indicated, the vehicles receive during straight-ahead driving a tendency to move away from the respective side rail which in turn is prevented by the guide magnets cooperating with said side rail.

A disadvantage in the known arrangement is first that the weight of the vehicles is considerably increased by the guide magnets and further that the structural requirements along the path of travel are considerably increased by the guide rails. Furthermore, particularly in the case of high travelling speeds there exist additional air resistances and eddy-current effects. Finally the lateral forces cannot be changed directly in the support magnets; lateral directing forces are obtained only from the displacement of the support magnets relative to the support rail. Therefore, there exists the danger, particularly under the effect of suddenly occurring strong air pulses, that the support magnets which are positioned oppositely the narrowed-down zone of the straight-ahead directed support rail, may be disconnected from said support rail. At least, one can expect considerable interference in the support system and consequently also of the guide means.

The purpose of the invention is therefore to disclose means by which vehicles with support magnets can be held in a suspended position opposite a rail arrangement by using magnetic attraction and can at the same time be guided in lateral direction without need for special guide magnets and rails, whereby without a lateral deflection of the support magnets from their nominal position with regard to the respectively associated rail a change in the lateral forces can be developed.

Commencing with a suspended railway in which vehicles are held freely suspended opposite magnetically conductive rails through electromagnets arranged on both sides in a horizontal position, the invention suggests that not only, as known only for the switch zone, the electromagnets of one vehicle side, but also those of the other vehicle side, are in a magnetically asymmetric nominal position with respect to the associated rail while the electromagnets of both vehicle sides are arranged symmetrically in relation to the respective vehicle. The electromagnets can for example be offset laterally with respect to the rail.

In such an arrangement the electromagnets on a vehicle will not only apply attractive force onto the rails in vertical acting direction for supporting the vehicle, but also will apply to each vehicle side, such forces (so-called return forces) as will try to urge the vehicle laterally toward the respective rail. The important advantage to be obtained here is that in the electromagnets, which are arranged as support magnets, the gradients of the lateral forces can be controlled and thereby the lateral movement of the vehicle can actively be controlled solely by means of said magnets. By suitably regulating the energization of the electromagnets of both vehicle sides, the vehicle can be held at all times in a central position between both rails.

The basic purpose of the invention can also be attained in a different manner which lies within the scope of the invention. If one does not want to use a magnetically asymmetric nominal position of the electromagnets in relation to the associated rails, the electromagnets or coils on each vehicle side may be combined in groups of at least two approximately side-by-side arranged electromagnets or coils respectively and those of the respective group may then be differently energized. In this case the same effect as in the above-described arrangement is obtained. If for example the right electromagnet of one group is less energized than the left one, then same has the tendency to move perpendicularly to the right with respect to the associated rail. The return forces can be made still stronger in their effect if the pair of electromagnets has a greater width than the rail and thus extends on both sides to the same degree beyond the longitudinal edges of the rail.

According to both above outlined embodiments, the desired return forces are created between electromagnets (or coils) and magnetically conductive rails at the same time as the vertically effective forces.

Figure 2:
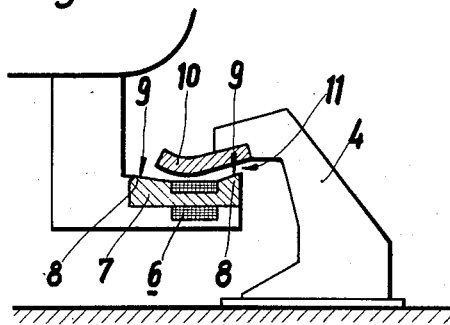
Figure 3:
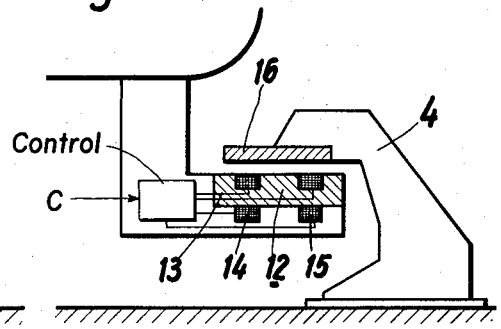

The invention and further developments thereof will be discussed more in detail hereinafter in connection with exemplary embodiments, as schematically illustrated in the drawing, in which FIG. 1 is a cross-sectional view of an arrangement for magnetically supporting and guiding a vehicle by using electromagnets which are laterally offset with respect to a rail, FIG. 2 is an arrangement according to FIG. 1, however, with electromagnets which have asymmetric U-shaped iron cores and FIG. 3 is a cross-sectional view of a further arrangement for magnetically supporting and guiding a vehicle by using magnetic cores which are associated in pairs with a rail.

It is noted that all of the arrangements which are illustrated in FIGS. 1 to 3 are for only one vehicle side but each is provided also on the other vehicle side in a mirror image construction.

In the arrangement according to FIG. 1, a support member 2 for a series of electromagnets 3 is secured on the bottom 1 of a vehicle, which is not illustrated further. These electromagnets 3, which are arranged in a horizontal position on the support member 2 and of which in the illustration only one is visible, are if desired distributed over the entire vehicle length and are spaced at selected, and the same, distance from a magnetically conductive rail 5 which is secured on a rail member 4. Furthermore, the electromagnets 3 are laterally offset with respect to the rail 5 as shown in the illustration. In this manner, in addition to vertically directed attractive forces which hold the vehicle in a suspended position, so-called return forces act at the same time between the energized electromagnets 3 and the rail 5. The latter try to urge the electromagnets 3 into a symmetrical position with respect to the rail 5 which, however, is prevented by the corresponding return forces which in the arrangement shown act on the not illustrated other vehicle side. Using these return forces, by suitable control of the energization of the electromagnets 3, the vehicle is maintained at all times in a central position between the rails 5 on both vehicle sides. The energization of the electromagnets 3 can be regulated in a usual manner.

Instead of offsetting the electromagnets 3 with respect to the rail 5, it can also be provided that same have a greater width than the rail, whereby these electromagnets are also arranged in an asymmetrical nominal position with respect to the rail. Also, they can in addition be offset with respect to the rail.

It is understood that in such an arrangement — with electromagnets 3 which have both a support and also a lateral guide function — more energy will be required for energization than in those electromagnets which have only a support function. In order to keep this additional energy need as low as possible, one can choose electromagnets and rails of a particular shape. For example, as shown in FIG. 2, an electromagnet 6 has an asymmetrical U-shaped iron core 7 with pole shoes 8 of different width and which have pole surfaces 9 which are inclined to one another. An associated rail 10 has an asymmetrical V-shaped profile corresponding to this shape of the pole shoes 8 and the chosen offsetting of electromagnet 6 with respect to rail 10. In this arrangement, the magnetic leakage compared with the useful flux between the iron core 7 and the rail 10, particularly in the air gap 11, will be minimized. Here, too, the electromagnet 6 tends to move itself, and thereby the vehicle, perpendicularly with respect to the rail 10 in a direction towards its support 4.

In contrast with the above-described arrangements, in the arrangement according to FIG. 3, two coils in form of an electromagnet 12 with an E-shaped iron core 13 and two windings 14 and 15 are associated with a rail 16, whereby the electromagnet is arranged in a symmetric nominal position with respect to the rail. If for example a higher voltage is applied to the left one of these windings 14 and 15 than to the right one by a control C, then the electromagnet 12 tends to move horizontally perpendicularly to the rail 16 and toward its support 4. By using a similar arrangement on the not illustrated left vehicle side, a stable lateral guide can again be obtained.

Such an arrangement has the further important advantage that for guiding in a switch zone, electromagnets 12 on only one vehicle side are sufficient. The windings 14 and 15 need then be for example only alternately energized.

The embodiments of the invention in which an exclusive property or privilege is claimed are defined as follows:

1. An electromagnetic suspension system for vehicles, comprising:
    electromagnetic means comprising two rows of electromagnets arranged side-by-side on opposite sides of said vehicle and extending in a horizontally aligned relation;
    a pair of magnetically conductive rails on opposite sides of said vehicle, each of said electromagnets being opposed by one of said magnetically conductive rails, each of said magnetically conductive rails being narrower in width than the combined width of said rows of said electromagnets, said electromagnets being adapted to freely suspend said vehicle and to define a lateral guidance means for maintaining an equal spacing of said vehicle from said pair of said magnetically conductive rails, said electromagnets lie in pairs opposite one another on said both sides of said vehicle and being symmetrically arranged relative to the longitudinal axis of said vehicle, each of said electromagnets being magnetically asymmetrically arranged relative to each of said magnetically conductive rails when said vehicle is equidistant from said magnetically conductive rails; and
    control means for energizing the electromagnets of one row greater than in the other row.

2. An electromagnetic suspension system according to claim 1, wherein said electromagnets comprise an E-shaped iron core and a pair of windings to thereby define said two rows of electromagnets.

3. An electromagnetic suspension system for vehicles, comprising:
    electromagnet means mounted on both sides of said vehicle and extending in a horizontally aligned relation, said electromagnet means comprising an asymmetrical U-shaped iron core and means defining pole shoes having pole shoe faces of differing widths, one pole shoe facing being inclined to the other pole shoe face;
    a pair of magnetically conductive rails on opposite sides of said vehicle and having an asymmetrical V-shaped profile corresponding to the inclination of the pole shoe faces, said electromagnet means being adapted to freely suspend said vehicle and to define a lateral guidance means for maintaining an equal spacing of said vehicle from said pair of said magnetically conductive rails, said electromagnet means lying in pairs opposite one another on said both sides of said vehicle and being symmetrically arranged relative to the longitudinal axis of said vehicle, each of said electromagnet means being magnetically asymmetrically arranged relative to each of said magnetically conductive rails when said vehicle is equidistant from said magnetically conductive rails.

4. An electromagnetic suspension system for vehicles, comprising:
   electromagnet means mounted on both sides of said vehicle and extending in a horizontally aligned relation;
   a pair of magnetically conductive rails on opposite sides of said vehicle, said electromagnet means being adapted to freely suspend said vehicle and to define a lateral guidance means for maintaining an equal spacing of said vehicle from said pair of said magnetically conductive rails, said electromagnet means lying in pairs opposite one another on said both sides of said vehicle and being symmetrically arranged relative to the longitudinal axis of said vehicle, each of said electromagnet means being magnetically asymmetrically arranged relative to each of said magnetically conductive rails when said vehicle is equidistant from said magnetically conductive rails so that said electromagnet means (1) effects a free suspension of said vehicle from said conductive rails and (2) effects, through said magnetically asymmetrical arrangement, said lateral guidance of said vehicle while moving along said conductive rails.

* * * * *